US005790730A

United States Patent [19]
Kravitz et al.

[11] Patent Number: 5,790,730
[45] Date of Patent: Aug. 4, 1998

[54] PACKAGE FOR INTEGRATED OPTIC CIRCUIT AND METHOD

[76] Inventors: Stanley H. Kravitz, 26 Aspen Rd., Placitas, N. Mex. 87043; G. Ronald Hadley, 6012 Annapolis NE.; Mial E. Warren, 3825 Mary Ellen NE., both of Albuquerque, N. Mex. 87111; Richard F. Carson, 1036 Jewel Pl. NE., Albuquerque, N. Mex. 87123; Marcelino G. Armendariz, 1023 Oro Real NE., Albuquerque, N. Mex. 87123

[21] Appl. No.: 336,902

[22] Filed: Nov. 10, 1994

[51] Int. Cl.$^6$ ............................................ G02B 6/30
[52] U.S. Cl. ................... 385/49; 385/14; 385/33; 385/37; 385/92; 385/93
[58] Field of Search ................... 385/14, 33, 37, 385/49, 92, 93

[56] References Cited

U.S. PATENT DOCUMENTS

| | | | |
|---|---|---|---|
| 4,466,696 | 8/1984 | Carney | 350/96.2 |
| 4,826,272 | 5/1989 | Pimpinella | 350/96.2 |
| 4,933,262 | 6/1990 | Beguin | 385/14 |
| 5,003,550 | 3/1991 | Welch | 372/50 |
| 5,109,455 | 4/1992 | Niswonger | 385/94 |
| 5,163,108 | 11/1992 | Armiento | 385/89 |
| 5,195,150 | 3/1993 | Stegmueller | 385/33 |
| 5,268,066 | 12/1993 | Tabasky | 156/633 |
| 5,282,080 | 1/1994 | Scifres | 359/344 |
| 5,321,718 | 6/1994 | Waarts | 372/108 |

OTHER PUBLICATIONS

Robert G. Hunsperger, *Integrated Optics: Theory and Technology*, 3rd Edition, [Springer-Verlag, New York, Jan. 1991] pp. 90–108, 329–330.

Robert G. Hunsperger, *Integrated Optics: Theory and Technology*, 3rd Edition, [Springer-Verlag, New York, Jan. 1991] pp. 300–321, 341–342.

Eugene D. Jungbluth, "Hybrid Technique Couples Laser Array to Fibers," *Laser Focus World*, May 1991, p. 217.

S. H. Kravitz, G. R. Hakley, M. E. Warren, J. R. Wendt, G. A. Vawter, J.C. Word, R. F. Corless, R. F. Carson, M. G. Armendariz, B. E. Hammons, and R. E. Liebenguth, "Waveguide-to-Fiber Coupling Using a Second-Order Grating and an Anamorphic Binary Optic," *LEOS'93 Conference Proceedings*, [IEEE, Piscataway, New Jersey, Nov. 15, 1993] pp. 472–473.

G. R. Hadley, "Numerical Simulation of Reflecting Structures by Solution of the Two–Dimensional Helmholtz Equation," *Optics Letters*, vol. 19, pp. 84–86, Jan. 15, 1994.

J. Jahns, "Diffractive Optics Moves from Theoretical to Applied," *Optics & Photonics News*, [OSA, Washington, D.C., Sept. 1994] 20–21.

G. Hatakoshi and K. Goto, "Grating Lenses for the Semiconductor Laser Wavelength," *Applied Optics*, vol. 24, pp. 4307–4311, Dec. 15, 1985.

G.J. Swanson and W. B. Veldkamp, "Diffractive Optical Elements for Use in Infrared Systems," *Optical Engineering*, vol. 28, pp. 605–608, Jun. 1989.

*Primary Examiner*—Rodney B. Bovernick
*Assistant Examiner*—Robert E. Wise
*Attorney, Agent, or Firm*—John P. Hohimer

[57] ABSTRACT

A structure and method for packaging an integrated optic circuit. The package comprises a first wall having a plurality of microlenses formed therein to establish channels of optical communication with an integrated optic circuit within the package. A first registration pattern is provided on an inside surface of one of the walls of the package for alignment and attachment of the integrated optic circuit. The package in one embodiment may further comprise a fiber holder for aligning and attaching a plurality of optical fibers to the package and extending the channels of optical communication to the fibers outside the package. In another embodiment, a fiber holder may be used to hold the fibers and align the fibers to the package. The fiber holder may be detachably connected to the package.

27 Claims, 5 Drawing Sheets

PACKAGE FOR INTEGRATED OPTIC CIRCUIT AND METHOD

This invention was made with Government support under Contract No. DE-AC0494AL85000 awarded by the U.S. Department of Energy. The Government has certain rights in the invention.

FIELD OF THE INVENTION

The present invention relates to integrated optic circuit packaging and, more particularly, to a package having a plurality of microlenses formed therein for establishing a plurality of channels of optical communication with the integrated optical circuit, and a method of forming such a package.

BACKGROUND OF THE INVENTION

Integrated optical circuits (IOCs) are becoming increasingly important for many applications including telecommunications, optical computing, optical interconnects, and phased array antenna drivers. The complexity of IOCs is also increasing; and there is an increasing need for improved packaging methods for making optical interconnections (i.e. optical or light inputs and/or outputs) to an IOC. A discussion of the applications of IOCs and current trends in their development may be found in a book entitled "Integrated Optics: Theory and Technology, 3rd Edition" by R. G. Hunsperger, Chapter 17, pages 300–321, published by Springer-Verlag, 1991.

The prior art packages and packaging methods for IOCs have several disadvantages that limit their usefulness and range of applicability for present and future IOCs. These disadvantages, discussed in more detail below, include the difficulty in coupling optical waveguides in an IOC to optical fibers; the difficulty in routing optical signals within the IOC chip to locations needed for providing a plurality of optical inputs and outputs; and the difficulty in providing a hermetically-sealed IOC package when optical fibers penetrate the walls of the package.

The first disadvantage of the prior art method of butt coupling (also termed pigtailing) an optical fiber to an IOC waveguide is that it is extremely difficult to establish and maintain correct alignment, since both the fiber core and waveguide typically have micron sized dimensions. For single-mode fibers and waveguides, the alignment tolerances in the directions transverse to the direction of the light propagation are typically about 1 micron or less for efficient butt coupling. Furthermore, it is necessary to maintain this alignment tolerance while the optical fiber is permanently bonded in place, and during the lifetime of the IOC device. For alignment to such tight tolerances, active optical alignment methods have been generally used, based on the propagation of a light beam between the IOC chip and the optical fiber and a measurement of the optical throughput or coupling efficiency during the alignment process. This "hands-on" approach to fiber coupling of IOCs is a labor intensive process, resulting in a high packaging expense for the IOC device.

When a plurality of optical fiber connections must be made to an IOC chip, a preferred method in the prior art has been to attach the optical fibers to a plurality of V-grooves formed in a silicon submount as disclosed by Tabasky et al in U.S. Pat. No. 5,268,066. The silicon submount or waferboard is then aligned to the IOC chip and attached thereto. The dimensions of the V-grooves may be lithographically determined to tolerances of about ±1 micron. In addition, the outer diameter of individual optical fibers may vary slightly by a few microns, adding to the difficulty locating the optical fibers in the silicon submount to the precision required for optimum optical coupling. As a result, while good coupling efficiencies (up to 75%) have been reported in some instances; the reported coupling efficiency in other instances has been much lower (as low as 6–7%).

The coupling efficiency is also affected by the match of the transverse mode profile of the light propagating in the optical waveguide and fiber. The transverse mode profile of the light propagating within a single-mode IOC optical waveguide is generally elliptical; whereas that of the single-mode optical fiber is generally circular (i.e. gaussian). The transverse dimensions of the waveguide and fiber are also different due to the differences in the index of refraction of the different materials used for the waveguide and fiber. As a result, there is usually a large difference in the numerical apertures of the IOC optical waveguide (especially in the direction perpendicular to the plane of the IOC chip) and the optical fiber. For example, the numerical aperture may be up to 0.9 for the IOC waveguide in the direction perpendicular to the plane of the IOC chip as compared with about 0.16 for a single-mode optical fiber. This difference in numerical aperture results in a modal mismatch loss unless an anamorphic lens is placed inside the package between the waveguide and fiber and aligned for mode matching. The use of such lenses in the prior art is often avoided due to the increased expense.

The second disadvantage of the prior art IOC packaging methods is the need to route optical signals to the edge of the IOC chip for coupling to an optical fiber. This signal routing approach of prior art IOCs is similar to the routing of electrical signals to bond pads in electronic integrated circuits. However, whereas a multi-level metallization technology has been developed for electronic integrated circuits to allow the crossing of electrical conductors, no similar technology has been developed for IOCs. Integrated optical circuits generally have only a single waveguide layer; and the crossing of waveguides in this layer is undesirable since it would result in optical loss and cross-talk. Thus, as IOCs become increasingly more complex with the need for a large number of optical inputs and outputs, the problem of routing optical signals to the edge of the IOC chip without the crossing of waveguides must be solved or it will dominate and restrict IOC design. One solution to this problem is found in the present invention that presents a method for establishing channels of optical communication to and from a packaged IOC chip in a direction that is substantially normal to the plane of the chip, and from any waveguide location on the chip. In the present invention, a plurality of optical fibers may be connected to the IOC package to extend the channels of optical communication to the fibers.

The third disadvantage of the prior art IOC packaging methods is the difficulty in providing a hermetically-sealed IOC package when optical fibers penetrate the walls of the package. The prior art method for forming such a hermetic package relies on the use of optical fibers penetrating through one or more walls of the package. In the prior art, each optical fiber that penetrates the package wall is individually secured to the package wall with an adhesive between the outer surface of each fiber and the package wall to seal the penetration; or a portion of the outer surface of each fiber is metallized and the fiber is soldered in place to the package wall sealing the penetration. This prior art hermetic packaging method is labor intensive requiring the individual alignment and attachment of each fiber, with the possibility of conflicting requirements between the attainment of an optimum optical coupling to the IOC and an optimum sealing of the package. These conflicting requirements result from the need to securely attach each optical fiber at two places (the fiber output end is attached to the IOC chip and a portion of the outer surface of the fiber is attached to the package wall). Problems in attaining a hermetically sealed package for the IOC may also arise due to the presence of voids in the adhesive or solder, or a poor adhesion of any applied metallization on the outer surface of the fibers.

An advantage of the package and method of the present invention is that an IOC may be packaged so that a plurality of channels of optical communication may be established between the IOC and optical fibers, or between the IOC and a free-space environment outside of the package.

Another advantage of the present invention is that an IOC package may be formed with no optical fibers penetrating the package walls and possibly affecting the hermeticity of the package.

Another advantage of the present invention is that a plurality of optical fibers may be mounted in a fiber holder outside the packaged IOC for a removable attachment of the fibers to a fiber coupler on the packaged IOC.

A further advantage of the present invention is that a plurality of channels of optical communication may be established between the integrated optical circuit and optical fibers in a single alignment step.

Another advantage of the present invention is that a channel of optical communication may be established between an optical fiber and an optical waveguide of the IOC at any waveguide location on the IOC chip.

Another advantage of the present invention is that microlenses may be located within a wall or lid of the package to direct light signals into and out of the package, and providing collimation and focusing optical functions for the light signals.

A further advantage of the present invention is that, when surface gratings are used on the IOC chip to couple light signals into and out of the chip, the tolerances for alignment of microlenses on a wall or lid of the package may be larger than those for prior art butt-coupled packaging methods.

Another advantage of the present invention is that it avoids the need for any attachment of an optical fiber directly to an IOC chip being packaged, and thereby reduces the possibility for damage to the IOC chip during packaging as compared with prior art butt-coupled packaging methods.

Still another advantage of the present invention is that a plurality of optical fibers may be pre-aligned to microlenses in a wall or lid of the package and attached thereto prior to the insertion of the IOC and sealing of the package.

A further advantage is that a substrate portion of a wall or lid of the package of the present invention may comprise two different material layers, a first layer of a first material suitable for forming microlenses in a first surface thereof, and a second layer of a second material suitable for forming an optical fiber coupler in a second surface thereof.

Another advantage of the present invention is that a lithographic method may be used for forming microlenses on a first surface of a substrate portion of a wall or lid of the package to provide a near-exact registration to surface gratings similarly formed on an IOC chip.

These and other advantages of the package and method of the present invention will become evident to those skilled in the art.

SUMMARY OF THE INVENTION

Accordingly, it is a primary object of the present invention to provide a package and method which overcomes the disadvantages of the prior art packaging for IOCs.

An additional object is to provide a package and method for fiber coupling to integrated optic circuits in which no optical fibers penetrate any walls of the package.

A further object of the invention is to provide for aligning and attaching a plurality of optical fibers to an outer surface of the package to establish a plurality of channels of optical communication between the optical fibers and a packaged IOC chip.

Another object of the invention is to provide a package and method for IOCs in which optical fiber alignment tolerances may be larger than those afforded by prior art butt-coupling packaging methods.

Still another object of the invention is to provide a package and method that uses lithography for forming microlenses on a substrate portion of a wall or lid of the package to provide a a near-exact registration to surface gratings similarly formed on an IOC chip.

Yet another object of the invention is to provide a package and method that uses lithographically formed registration patterns and solder bump alignment methods to passively align the IOC chip and the microlenses.

Additional objects, advantages, and novel features of the invention will become apparent to those skilled in the art upon examination of the following description, or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as described herein, a package and a method is provided for packaging an integrated optical circuit (IOC) having a plurality of surface gratings formed on a device surface of the IOC. According to an embodiment of the invention, the package and method comprises a plurality of interconnected walls forming a container for holding the IOC, one of the walls further comprising a substrate portion having a plurality of microlenses forming a microlens pattern in a first surface thereof. The package and method further comprises a first registration pattern located on an inside surface of one of the walls for alignment and attachment of the integrated optic circuit. This first registration pattern matches or corresponds to a second registration pattern on the integrated optic circuit so that, when the first and second registration patterns are aligned, the packaged IOC may be in superposition with the microlenses. (The first and second registration patterns may have a substantially equal spatial arrangement, or the patterns may be complimentary with the first registration pattern abutting or partially overlapping the second registration pattern when the two patterns are aligned.) A passive alignment of the first and second registration patterns may be performed, for example, by the use of a plurality of solder bump bonds, with the solder upon melting providing a surface tension that acts to align the superposed registration patterns thereby bringing the IOC into alignment with the first registration pattern. Upon solidifying, the solder bump bonds attach the IOC to the package with the alignment maintained.

The wall having the substrate portion, hereinafter termed the first wall, may form a wall of an open container, with yet another wall being a lid attachable to the open container to form a closed container for holding the IOC. Alternately, the first wall may be a lid attachable to an open container formed by the other walls to form the closed container for holding the IOC. The component parts of the package (i.e. the open container and lid portions, and the fiber holder) of the present invention also may be provided in kit form for assembly by a manufacturer or end user of IOCs.

In the present invention, channels of optical communication are established between the IOC inside the package and the free-space environment outside the package by means of microlenses located within the first wall of the package. The microlenses may further act to extend these channels of optical communication to optical fibers, each optical fiber being positioned above an outside surface of the first wall in alignment with one of the microlenses along an optical axis.

The channels of optical communication thus established with the IOC may be used to communicate optical signals from a plurality of points in space outside the package to a plurality of surface gratings in a device surface of the IOC, or to communicate optical signals from the surface gratings of the IOC to points in space outside the package, or both. The channels of optical communication extending outside the package may be free-space channels (i.e. beams of light); or they may be extended to include optical fibers for conveying the light signals.

In another embodiment of the invention, a fiber coupler is formed in a second surface of the first wall for holding a plurality of optical fibers in optical alignment with the microlenses at a focal point thereof (i.e. each optical fiber being positioned along the axis of a microlens at a focal distance therefrom). Furthermore, the optical fibers may be mounted in a fiber holder with a spaced relationship between the fibers that is matched to a microlens pattern formed by the microlenses. In this way, the optical fibers may be attached or connected to the fiber coupler in a single alignment step to establish a plurality of channels of optical communication with the integrated optical circuit.

In accordance with the invention, the surface gratings on the IOC are preferably even-order diffraction gratings; and the surface gratings also may be designed with a grating periodicity that is slightly detuned from an operating wavelength of light in the IOC to reduce a backward reflection component of the light in the IOC waveguides.

Also, in accordance with the invention, the microlenses may be either refractive lenses or diffractive lenses.

Furthermore, in accordance with the invention, a plurality of optical fibers may be connected to the IOC package in a detachable manner.

Other objects, advantages and novel features of the invention will become apparent from the following detailed description thereof when considered in conjunction with the accompanying drawings.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
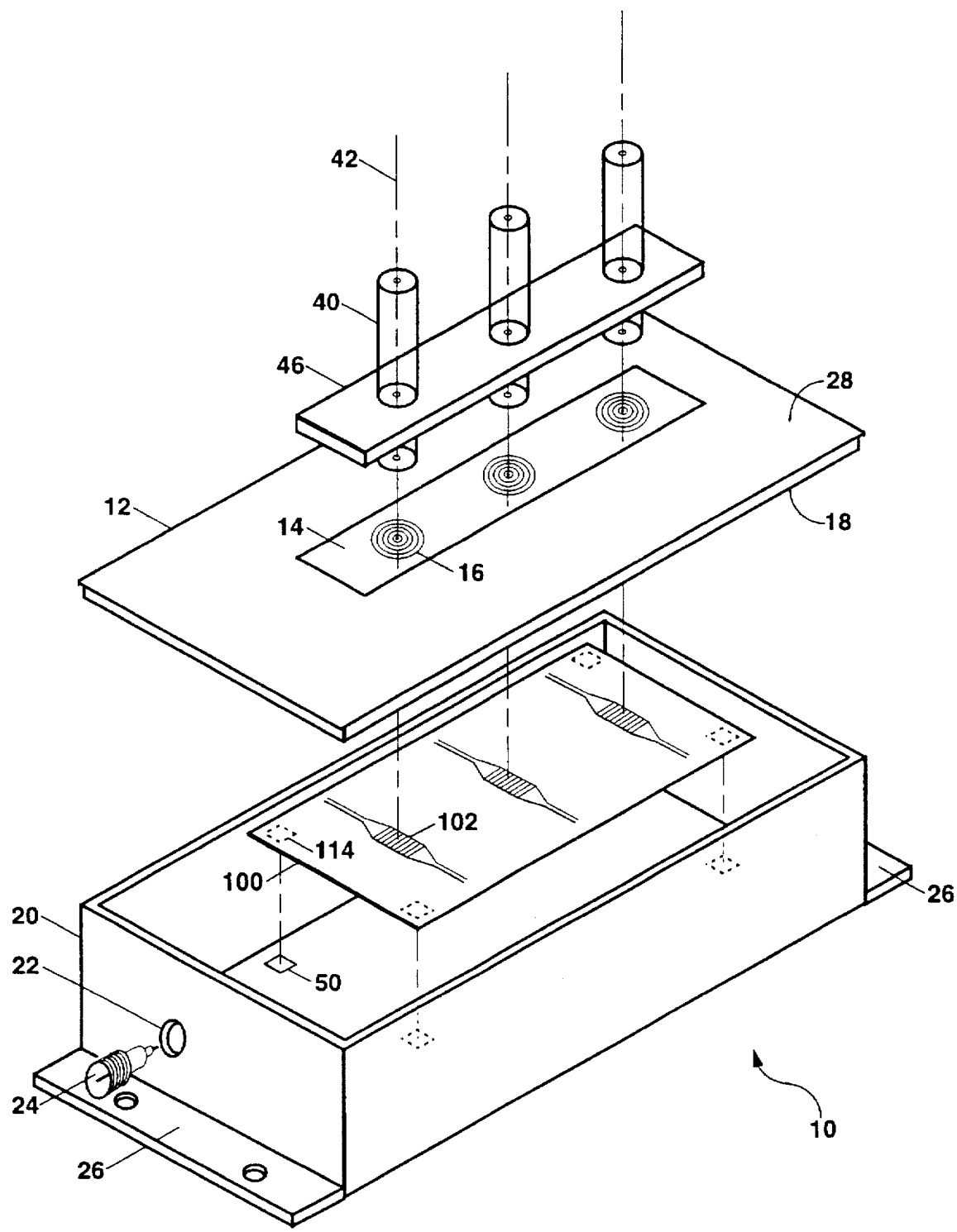
FIG. 1 shows a schematic illustration of a first embodiment of the IOC package according to the present invention.

Referring to FIG. 1, there is shown a schematic diagram of a package 10 for an integrated optic circuit (IOC) 100 in accordance a first embodiment of the present invention. The package 10 comprises a first wall 12 having a substrate portion 14 comprised of a plurality of microlenses 16 formed in a first surface 18 of the first wall 12. The first wall 12 is attachable to a plurality of other walls for forming a closed container or package 10 for the IOC 100.

According to the first embodiment of the invention shown in FIG. 1, the other walls may be interconnected to form an open container 20. The open container 20 preferably consists of an impervious material such as a metal, ceramic, resin, plastic, or the like. The open container 20 is preferably formed as a single unit by a molding, stamping, or machining process. The open container may have one or more openings 22 in the walls thereof shaped to receive an electrical connector 24 for supplying electrical power and signals to the IOC 100 and associated electrical circuits or components that may be packaged therewith.

Figure 2:
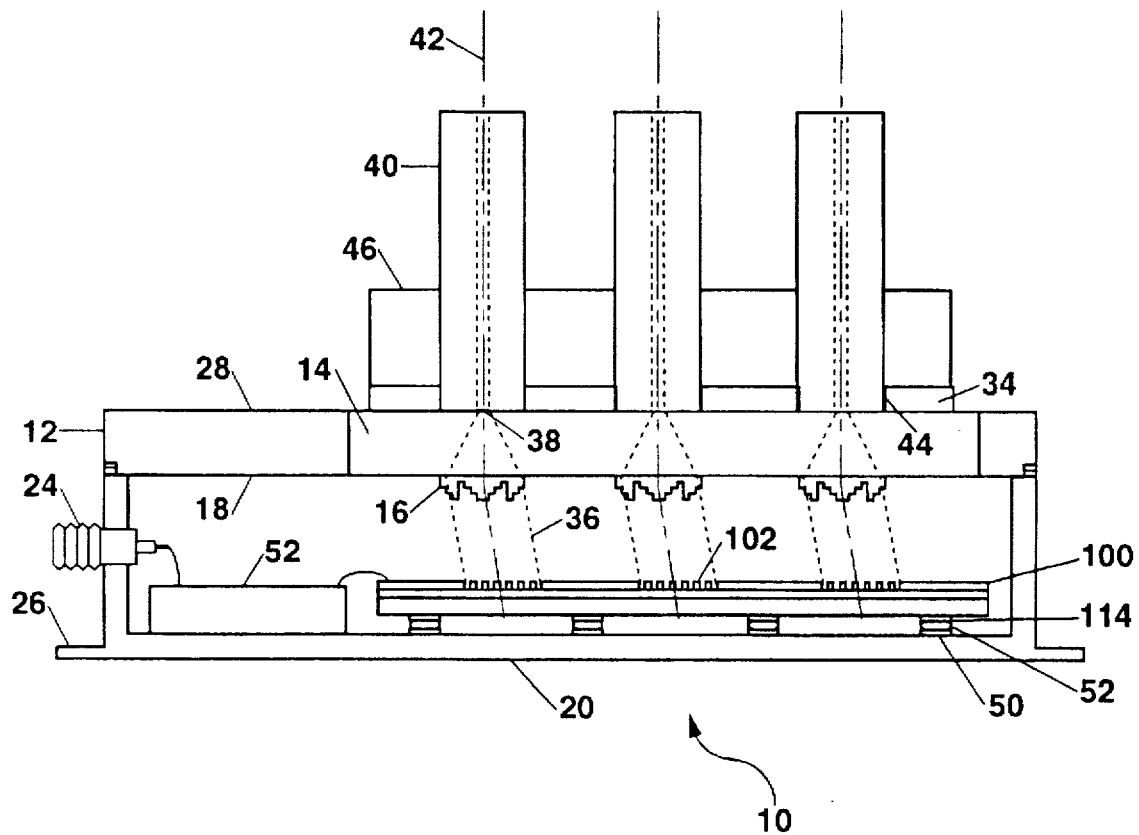
FIG. 2 shows a schematic illustration of a second embodiment of the IOC package according to the present invention.
Figure 3:
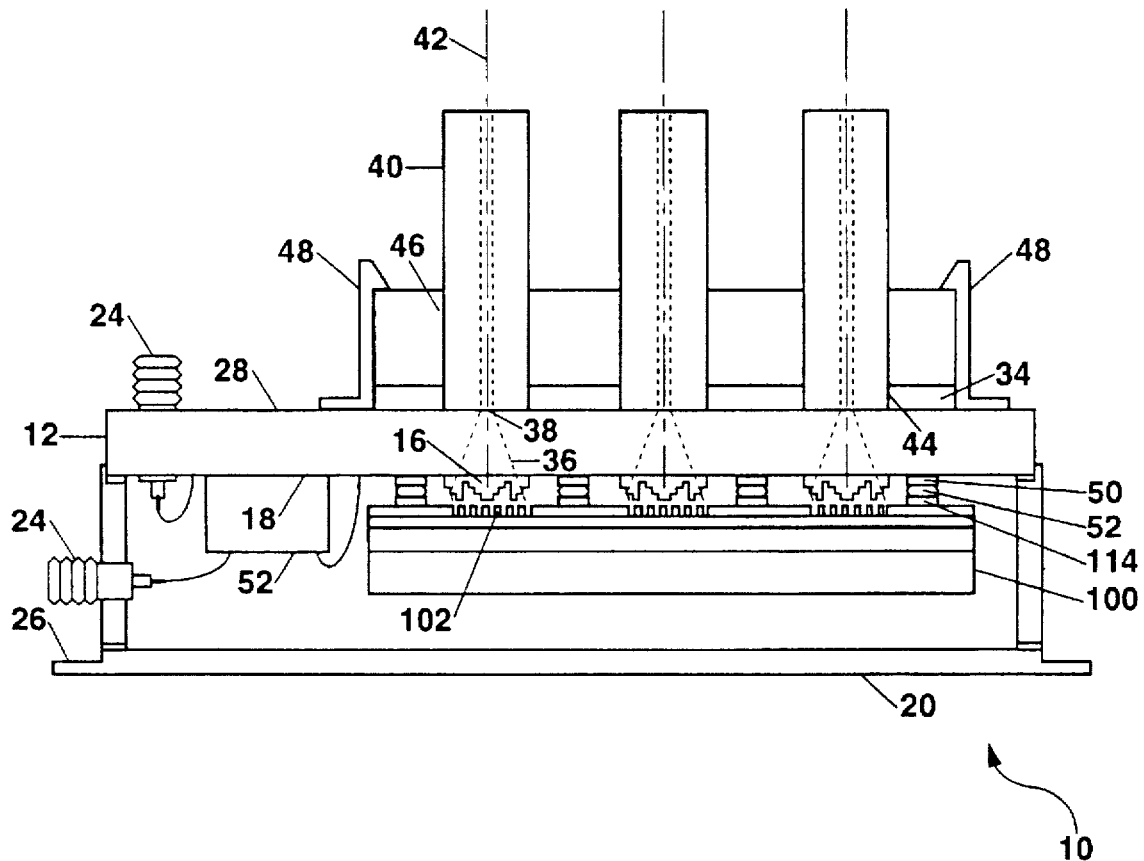
FIG. 3 shows a schematic illustration of a third embodiment of the IOC package according to the present invention.

The open container 20 may further comprise attachment means on the outer surface of the open container 20 for mounting the package 10, such as the mounting flanges 26 shown in FIGS. 1–3. The open container 20 preferably has a rectangular cross-section shape as shown in FIGS. 1–3; but, depending on the particular type of IOC to be packaged and other packaging constraints, the open container may have other cross-sectional shapes including a circular cross-section shape. The open container 20 may also include one or more walls thereof that are of an increased thickness, or finned, or otherwise shaped to function as a heat sink for the packaged IOC.

The opening of the container 20 may include registration features on the edge surfaces thereof for a precisely positioned attachment the first wall 12. Such registration features may include, for example, a plurality of upward-facing pins spaced around the edge of the container to engage a plurality of holes formed in the lower surface of the first wall 12 at matching locations, or a recessed inside edge of the container opening to receive a recessed outer edge of the first wall 12 as shown in FIGS. 2 and 3.

The first wall 12 is sized to fit upon the opening of the container 20 so that the first wall 12 may be attached thereto to form a closed container (i.e. the package 10) for the IOC 100. The thickness of the first wall and the other walls of the package 10 may be from about 0.5 to about 3 millimeters thickness, and may vary depending upon the size of the package 10 and the environment to which the package 10 will be exposed. The package 10 may be of a size slightly larger than an IOC 100, or it may be much larger than the IOC 100 if additional electrical circuits and components are included in the package 10.

The first wall 12 comprises a substrate portion 14 that is attached to the first wall as shown in FIGS. 1 and 2. The portion of the first wall 12 outside the substrate portion 14 may be comprised of an impervious material identical to that of the open container 20. Alternately, the first wall 12 may be formed entirely from a substrate portion 14 as shown in FIG. 3. In either case, the substrate portion 14 is preferably thermally compatible with the portions to which it is attached (either the first wall as in FIGS. 1 and 2, or the open container as in FIG. 3.

The substrate portion 14 comprises an impervious material that is transparent at an optical wavelength of the light in the IOC 100. Transparent materials that may be used for forming the substrate portion 14 include single- or polycrystalline materials (for example, sapphire or semiconductors such as silicon), amorphous glassy materials (for example, silicon dioxide or glass), resinous materials (for example, an epoxy resin), and plastics. For use with IOCs operating at a wavelength of about 1.3 to 1.5 microns, silicon and silicon dioxide are preferred materials for the substrate portion 14.

The substrate portion 14 also may comprise a layered structure formed from a plurality of layers of two or more different materials. For example, as shown in FIG. 5b, a first layer 30 of a first transparent material may be formed, deposited, or spun onto a substrate portion 14 to form the first surface 18 of the substrate portion 14. In this way, the first surface 18 and a second surface 28 of the substrate portion 14 may each be optimized for different purposes, and for the formation of different elements therein. For example, in FIG. 5b, the first layer 30 comprises a transparent material well-suited to the formation of a refractive microlens 16. In the example of FIG. 5b, a second layer 32 of the same or a different transparent material is formed, deposited, or spun onto the opposite side of the substrate portion 14 to form the second surface 28; and a fiber coupler 34 is subsequently formed in the second surface 28. For the formation of the fiber coupler 34, the second layer 32 may even be a metal layer with cavities 44 etched or drilled or otherwise formed therein down to the transparent substrate material below the second layer. The use of a substrate portion 14 comprising a layered structure may have advantages by providing a first surface layer 18 in which the microlens 16 may be conveniently and inexpensively formed by an etching, molding, or replication process; while providing a second surface layer 28 having a different material characteristic such as an increased hardness or environmental resistance. The materials selected for the first or second layer may also provide improved adhesion or solderability characteristics.

The microlenses 16 formed in the first surface 18 of the substrate portion 14 provide channels of optical communication into and/or out from the package 10. The first surface 18 is preferably an inside or lower surface of the first wall 12 of the package 10 as shown in FIGS. 1–3. The formation of the microlens 16 on the lower surface 18 of the substrate portion 14 in close proximity to the packaged IOC 100 is advantageous in that it reduces the size of the microlens 16 needed to receive a diverging light beam from the IOC; it allows a plurality of microlenses 16 to be more closely spaced on the substrate portion 14; it protects the lens 16 by enclosing it within the package 10; and it allows the second surface 28 of the first wall 12 to be used for attaching one or more optical fibers 40 thereto, or for the formation of a fiber coupler 34 therein for aligning the fibers 40 at a focal point 38 of the microlens 16.

The microlenses 16 form a one- or two-dimensional microlens pattern or array on the first surface 18, with the microlens pattern arranged to match the spatial locations of a plurality of surface gratings 102 in the IOC 100. The microlens pattern may be formed in the first surface 18 by using a lithographic step (for example, photolithography or electron beam lithography) to expose a resist pattern spun onto the first surface 18 with the patterned resist being used to form the microlenses 16 by an etching or deposition process. In this way, a nearexact correspondence between the spatial locations of the microlenses 16 on the substrate portion 14 of the first wall 12 and the lithographically-defined surface gratings 102 of the IOC 100 may be realized.

Figure 5A:
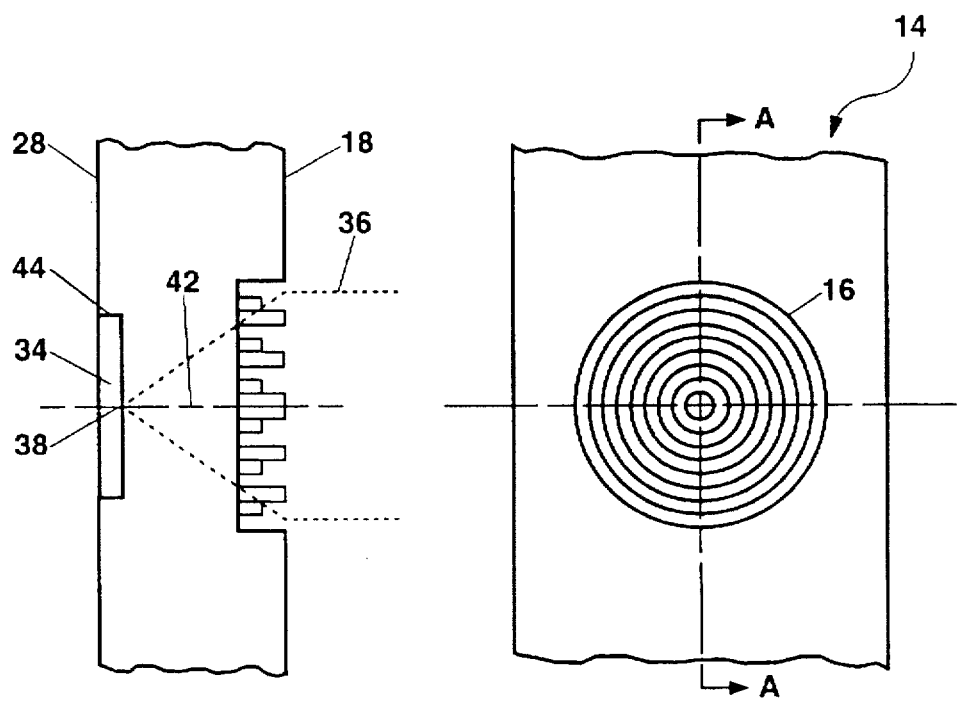
FIGS. 5a and 5b show schematic illustrations of diffractive and refractive microlenses, respectively, formed in the first surface of the substrate portion according to the present invention.
Figure 5B:
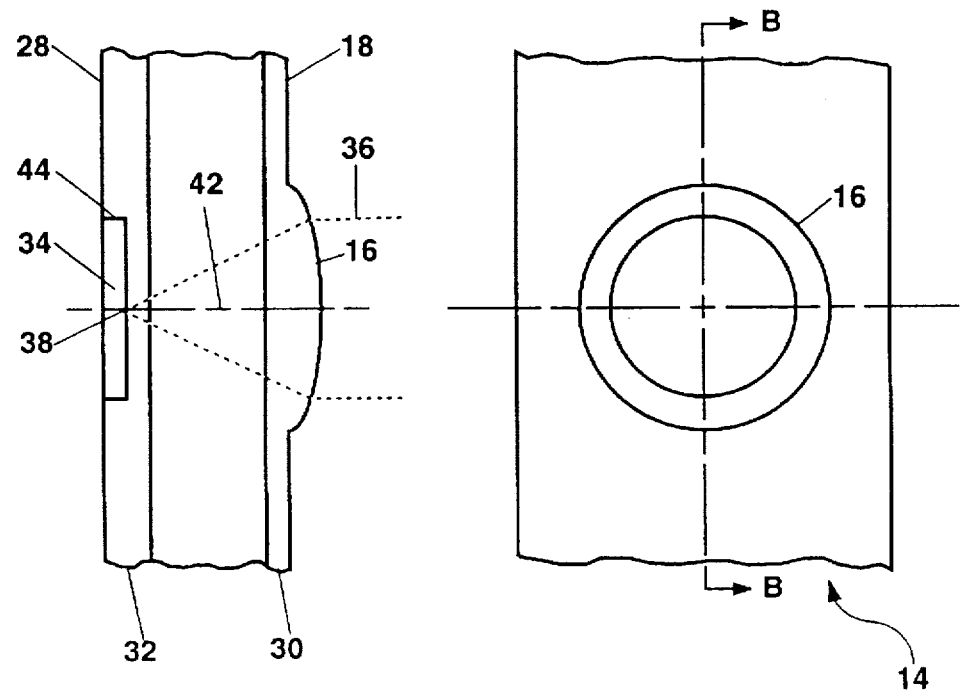

The microlenses 16 may be either diffractive lenses as shown in FIG. 5a or refractive lenses as shown in FIG. 5b.

Diffractive microlenses 16 may be formed by conventional integrated circuit processing methods, or by replication methods. For example, a lithographic process (for example, photolithography or electron beam lithography) may be used to expose and pattern a resist which has been spun on a silicon or silicon dioxide substrate and selectively removed to expose portions of the first surface 18 corresponding to the lithographic mask pattern. These exposed portions of the first surface 18 may then be etched into the silicon or silicon dioxide substrate to a depth that is a sub-multiple of the wavelength of the IOC light in the substrate by a wet or preferably a dry etch process (for example, reactive ion etching or reactive ion beam etching). Multiple resist, lithographic exposure, and etch steps may be used to form a number, n, of radially periodic discrete etch levels as shown in FIG. 5a. The etch levels from the multiple process steps above are preferably spatially overlapped, since this permits the number of phase levels that are generated by the n etch steps to be increased as $2^n$. Increasing the number of phase levels is advantageous in increasing the diffraction efficiency of the diffractive microlens 16 (i.e. increasing the fraction of the light beam 36 that is diffracted into the first order and thereby focused at a focal point 38). For example, the first-order diffraction efficiency of a diffractive microlens 16 may be about 40% when a single etch step is used to generate two phase levels. However, the diffraction efficiency increases to about 80% when two etch steps are used to generate four phase levels; and the diffraction efficiency increases to about 95% for three etch steps generating eight phase levels.

The microlenses 16 may also be refractive microlenses. A refractive microlens 16 as shown in FIG. 5b may be formed in the first surface 18 of the substrate portion 14 (or a first layer 30 of the substrate portion), for example, by molding or replicating a microlens pattern in a transparent glass, plastic, or resinous material. Such molding or replication processes may be performed by pressing a master microlens pattern against the first surface 18 when the transparent material is softened by heating, or prior to curing or hardening. Such molding or replication processes are also applicable to the formation of diffractive microlenses.

A refractive microlens may also be formed by conventional semiconductor processing methods by using a resist pattern to form cylindrical mesas that project outward from the first surface 18 of the substrate portion 14 (for example, by etching the entirety of the first surface 18 except for circular regions at the positions of the microlenses 16 downward to a depth of several microns or more). The cylindrical regions may then be rounded to form a lens shape with a radius of curvature as shown in FIG. 5b by heating the transparent material (for example, a plastic, glass, or a semiconductor) to a temperature below its melting point for a period of time sufficient for a mass flow of the material to form the curved lens shape. Anamorphic refractive microlenses may be similarly formed from mesas having, for example, an elliptical cross-section shape. Other methods for forming diffractive and refractive microlenses may be used as known to the art.

The size of the microlenses 16 may be about a few millimeters or smaller, with the size and curvature or phase profile preferably chosen to provide a focal point 38 of the IOC light beam 36 that is located just above the second surface 28 of the substrate portion 14 if optical fibers 40 are to be coupled to the package 10. For a free-space channel of optical communication, the focal point 38 of the microlenses 16 may be located well beyond the second surface 28 with the microlenses acting to collimate a diverging light beam 36 or to focus it at a distance from the package 10.

The diffractive and refractive microlenses 16 may be either circular or elliptical in shape. Elliptically-shaped anamorphic microlenses are especially useful when the light beam 36 is non-circular, since the anamorphic microlenses 16 may then be used to circularize the light beam 36 for a better coupling of the focused light beam to optical fibers 40.

The IOC package 10 is preferably a fiber-coupled package in which optical fibers 40 are attached to the second surface 28 of the substrate portion 14 of the first wall 12 to provide channels of optical communication between the fibers 40 and the IOC 100. For use with high-speed IOCs operating at frequencies of several hundred megaHertz or higher, the optical fibers 40 are preferably single-mode fibers. For lower-speed IOCs and for short-haul communications, multi-mode optical fibers 40 also may be used with the package 10.

Each optical fiber 40 is positioned along an optical axis 42 at the focal point 38 of one of the microlenses 16 (i.e. there is an individual optical axis 42 for each of the microlenses as shown in FIGS. 1–3). As an aid in precisely aligning the optical fibers 40 and attaching the fibers to the substrate portion 14, a fiber coupler 34 may be formed in the second surface 28 of the substrate portion 14. The fiber coupler 34 comprises a plurality of cylindrical or other shaped cavities 44 extending downward into the substrate portion from the second surface 28 as shown, for example, in FIGS. 2, 3, 5a, and 5b, with each cavity 44 located opposite one of the microlenses 16 along the optical axis 42. The cavities 44 may have vertical or sloped sidewalls. These cavities 44 are preferably flat-bottomed with a diameter slightly larger than that of the optical fiber 40 to be received therein; and the cavities 44 are formed to a depth (for example, about 10–100 micrometers) sufficient for placement of the fiber 40 therein. The focal point 38 of the light beam 36 is preferably located above the flat bottom of the cavity 44 so that it coincides with an end of the optical fiber 40 so that the light beam 36 may be coupled into or out from a core of the fiber 40. Anti-reflection coatings of one or more dielectric materials may be formed or deposited onto the bottom of the cavities 44 (and also on the microlenses 16) to reduce a reflection component of the light beam 36.

The cavities 44 may be etched, molded, or replicated into the second surface 28 in a manner similar to the formation of the microlenses 16. For example, the cavities 44 may be etched into a silicon or silicon dioxide substrate portion 14 by means of reactive ion etching or reactive ion beam etching after precisely locating the cavities 44 above the microlenses 16 by lithographically exposing a resist spun onto the second surface 28 of the substrate portion 14.

Since each cavity 44 of the fiber coupler 34 is centered about the optical axis 42 of one of the microlenses 16, the optical fiber 40 may be easily and accurately aligned to the microlens by positioning the fiber in the cavity 44. The optical fibers 40 may then be permanently attached to the second surface 28 by an adhesive (or by a metal solder if a portion of the outer surface of the fiber is metallized, and the second surface is solderable). This attachment of the optical fibers 40 to the second surface 28 may be performed prior to attaching the first wall 12 to the open container 20 to form a hermetically sealed package 10. This attachment of the fibers before sealing the package may be advantageous in allowing the alignment of the optical fibers 40 and the microlenses 16 and the light throughput to be measured for quality control purposes (for example, by transmitting a light beam from the fibers to the microlenses and measuring the light beams emerging from the microlenses; or performing the reverse measurement with the light beams incident on the microlenses and the fiber outputs measured).

Alternately, a plurality of optical fibers 40 may be attached to a fiber holder 46. The fiber holder 46 comprises a rigid material such as a metal, ceramic, semiconductor, resin, plastic, or the like that is preferably thermally compatible with the fiber coupler 34. The thickness of the fiber holder may be, for example, about 0.5 to 3 millimeters. The fiber holder 46 has a plurality of apertures formed therethrough, each aperture having a diameter slightly larger than that of an optical fiber 40 for receiving the fiber therein. The apertures through the fiber holder 46 may be etched or drilled (for example, by laser drilling) after they are precisely located to match the microlens pattern or the pattern of the cavities 44 in the fiber coupler 34. A lithographic process exposing a resist may be used to accurately locate the apertures when an etching process is used to form the apertures (as, for example, in a silicon fiber holder). If the apertures are laser drilled through the fiber holder 46, the apertures may be accurately located by using an interferometrically controlled stage for holding and aligning the fiber holder 46 for the laser drilling process.

The optical fibers 40 are preferably mounted in the apertures and secured therein so that the fibers protrude outward from a lower surface of the fiber holder 46 by a distance that is approximately equal to the depth of the cavities 44 in the fiber coupler 34. (The output ends of the fibers may be polished after the fibers are secured in the fiber holder 46.) The use of a fiber holder 46 then allows a plurality of optical fibers 40 to be quickly and accurately brought into alignment with the microlenses 16 of the IOC package 10 in a single alignment step. After aligning the fibers to the package, the fiber holder may be permanently attached to the second surface 28 by an adhesive or solder or welded joint; or the fiber holder 46 may be attached to the second surface 28 to provide a detachable connection as discussed below.

FIG. 3 shows a third embodiment of the present invention in which the fiber holder 46 is attached to the IOC package 10 by means of a pair of flexible spring clamps 48 attached to the second surface 28 of the first wall 12. (In FIG. 3 the first wall 12 except for the spring clamps 48 is formed entirely from the substrate portion 14.) The spring clamps 48, in the example of FIG. 3, are L-shaped with a tapered inside lip that acts to capture and retain the fiber holder 46 when the fiber holder is brought into alignment with the fiber coupler 34. The fiber holder 46 may be detached from the package 10 by applying an outward force to each of the spring clamps 48 thereby moving the spring clamps outward from the side of the fiber holder 46. Such a detachable fiber connection to the IOC package 10 is advantageous in allowing a plurality of channels of optical communication to be established with the IOC 100 for purposes of testing the packaged IOC, or for the replacement of a defective packaged IOC.

The substrate portion 14 may be attached to the first wall 12 after the formation of the microlenses 18 therein. The process for attaching the substrate portion 14 to the first wall 12 may be an adhesive bonding or soldering or welding process, or a process that forms a compression seal to the substrate portion 14 by means of downturned lips on the first wall 12 that press against the first and second surfaces of the substrate portion 14. The process for attaching the substrate portion 14 to the first wall 12 preferably forms an thermally stable impervious seal so that the package 10 may later be hermetically sealed.

Figure 4:
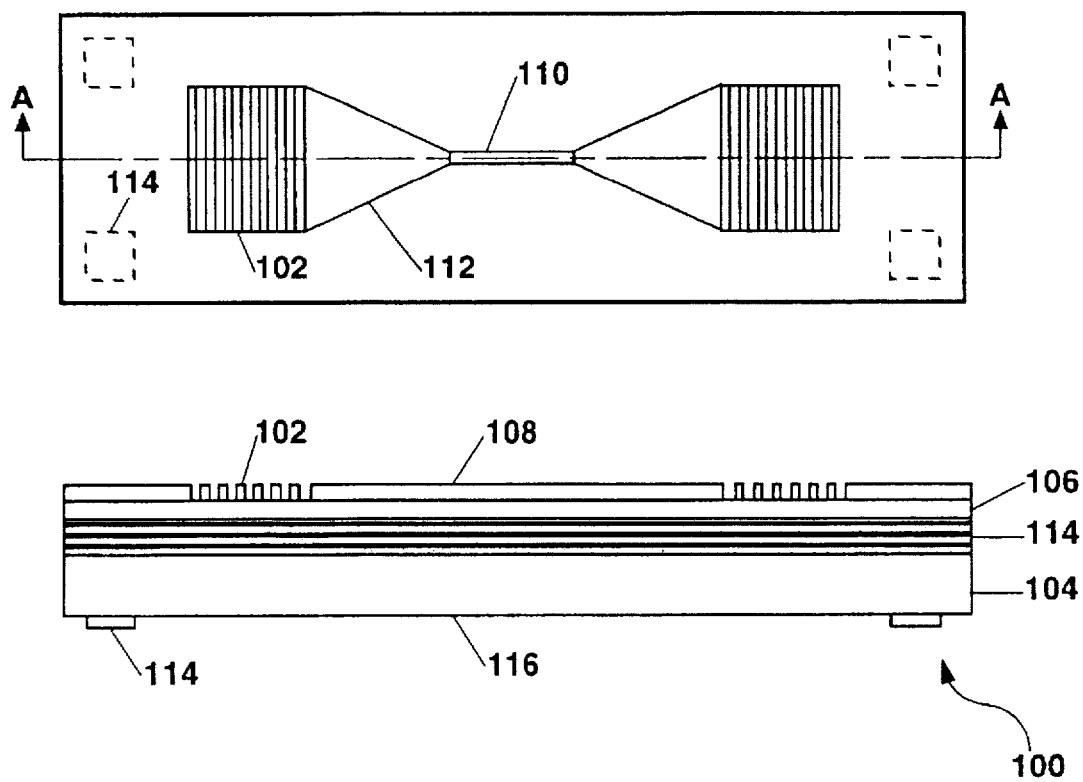
FIG. 4 shows a schematic illustration of an integrated optic circuit for use with the present invention.

FIG. 4 shows a schematic illustration of a portion of an integrated optic circuit (IOC) 100 for use with the package and method of the present invention. The IOC 100 comprises a semiconductor substrate 104 having a plurality of device layers deposited thereon. One of the device layers is an optical waveguide layer 106 that is used for forming the optical waveguides that convey the light within the IOC and for forming the active and passive optical elements to act upon that light in some manner (for example, to perform one or more modulation, demodulation, amplification, attenuation, filtration, detection, beam splitting, or beam combining functions, or the like as known to the art). Portions of a device surface 108 above the waveguide layer 106 are preferably metallized to apply one or more electrical signals to act upon the light therein as described above. A full-surface or patterned metallization may also be applied to a substrate surface 116.

A plurality of surface gratings 102 are formed in the device surface 108 above the optical waveguide layer 106. The surface gratings 102 preferably have a lateral dimension that is much wider than the optical waveguides 110 formed in the waveguide layer 106 in order to circularize the light beam 36 exiting the IOC, and to reduce the divergence of the light beam. An advantage of using a surface grating 102 that is substantially larger than the lateral dimension of the optical waveguides 110 (for example, a surface grating having lateral dimensions of about 50 to 100 micrometers as compared with a waveguide lateral dimension of a few micrometers) is that the tolerances for alignment of the surface gratings 102 to the microlenses 16 are much larger than those for prior art butt-coupled IOCs. The longitudinal dimension (along the direction of propagation of the light in the IOC) of the surface grating 102 may be different from the lateral dimension. As an example, when the lateral dimension of the surface grating is 50 micrometers, the longitudinal dimension may be about 200 micrometers. The preferred longitudinal dimension in general will depend upon the strength of the optical interaction of the surface grating 102 with the underlying optical waveguide layer 106.

The surface gratings 102 are preferably even-order diffraction gratings (for example, second-order gratings having a periodicity that is twice the wavelength of the light in the optical waveguide layer 106). A second-order diffraction surface grating 102 may be formed, for example, by direct electron beam lithography exposure of a portion of a resist pattern deposited on the device surface 108, with conventional lithography being used for exposure of the other portions of the resist pattern for patterning the optical waveguides and other components of the IOC 100. The electron beam dose in this example may be spatially varied to compensate for proximity effects and to prevent overexposure, especially of the edges of the grating pattern, particularly the edge of the grating connected to a flared waveguide region 112.

The patterned resist is then used to etch (preferably using a dry etching method such as reactive ion beam etching) a series of trenches into the device surface 108 down into the region of the waveguide layer 106 so that the light propagating in the waveguide layer is diffracted upward and out of the IOC by the surface grating. The etch depth of the trenches may be varied to control the diffraction efficiency of the surface grating 102. The use of a deeper etch for the trenches will permit a smaller longitudinal dimension for the surface grating 102. Alternately, a shallower etch for the trenches may be used if only a portion of the IOC light is to be coupled out at the surface grating, for example, when the remaining light is to be propagated beyond the surface grating to other waveguides and components of the IOC 100 as shown in FIG. 1. The trenches may have sidewalls normal to the device layer 108 or blazed at an angle (for example, 45 degrees) thereto. The surface gratings 102 may also act to couple a light beam 36 into the optical waveguide layer 106.

Since the even-order surface gratings 102 also act to diffract some of the light in the waveguide layer 106 downward away from the device surface 108 of the IOC 100, a Bragg reflector 114 comprising a plurality of alternating one-quarter-wavelength layers of high- and low-index semiconductor materials may be deposited on the substrate 104 below the waveguide layer 106 to reflect the downward propagating light upwards and to recombine the reflected light in phase with the upward diffracted light from the surface grating 102.

The periodicity of the surface grating 102 also may be detuned slightly from an even-multiple of the wavelength of the light in the waveguide 110 to reduce the reflection of the light from the waveguide 110. The effect of a slight detuning of the surface grating 102 is to direct the light beam 36 at a slight angle of a few degrees from the normal to the device surface 108 of the IOC 100. In this case, anamorphic microlenses 16 may be used to change the angle of the light beam so that it may be focused into the optical fibers 40 as shown in FIG. 2. When the light beam 36 has an elliptical cross-section shape due to the different lateral and longitudinal dimensions of the surface grating 102, an anamorphic microlens 16 may be used to circularize the focused beam and to compensate for the different divergence angles of the light beam.

In order to match the lateral mode of the light from the optical waveguide 110 to the surface grating 102, a flared waveguide region 112 is preferably interposed between the waveguide and the surface grating as shown in FIG. 4. The flared waveguide region 112 allows the light from the waveguide 110 to increase its lateral dimension by diverging while maintaining its lateral mode profile. The flared waveguide 112 has lateral dimensions matched to the waveguide at one end and to the surface grating at the other end, and a length that may be from about 0.2 to 1 millimeter or more. Multiple lithographic exposure steps may be used to define smooth vertical sidewalls in the resist for etching the device surface 108 to form the flared waveguide region 112. After etching the gratings and optical waveguides in the IOC, the device surface 108 may be planarized, for example, by spinning on a photo definable polyimide or the like. A patterned metallization is then applied to the IOC 100 to contact the electrically active components of the IOC.

The surface gratings 102 may act either to couple light out from the IOC 100, or to couple light into the IOC, or both. A plurality of surface gratings 102 may be connected to an optical waveguide 110 by means of flared waveguide regions 112 to provide optical inputs and outputs to the IOC 100 as shown schematically in FIG. 4. An advantage of the present invention is that the surface gratings 102 may be located anywhere on the surface of the IOC chip, thereby providing optical inputs and outputs at locations that may be difficult if not impossible for prior art butt-coupled packaging methods.

The microlens pattern should preferably correspond to the pattern of surface gratings on the IOC 100 so that when the IOC is packaged, each microlens will be superposed above a surface grating 102 along the optical axis 42 defined by the orientation and blaze angle of the surface gratings 102. A preferred means for superposing the microlenses and surface gratings is to form a first registration pattern 50 on an inside surface of one of the walls of the package 10 and to form a second registration pattern 114 on the device surface 108 or the substrate surface 116 of the IOC 100 as shown in FIGS. 1–4. The first and second registration patterns are arranged so that, when the first and second registration patterns are superposed, the microlenses 16 will be aligned with the surface gratings 102 when the first wall 12 is attached to the open container 20 to form the sealed IOC package 10. The first and second registration patterns may be lithographically formed, with the patterns (50 and 114) comprising patterned metallizations deposited on an inside wall and a surface of the IOC, respectively. FIGS. 1 and 2 show the first registration pattern 50 formed on the bottom wall of the open container 20, with the second registration pattern 114 formed on the substrate surface 116 of the IOC 100. Alternately, FIG. 3 shows the first registration pattern 50 formed on the first surface 18 of the first wall 12, with the second registration pattern 114 formed on the device surface 108 of the IOC 100. The first and second registration patterns may further comprise spacing or alignment blocks that extend outward from the surfaces of the package and the IOC to aid in bringing the first and second registration patterns into alignment.

A passive alignment of the first and second registration patterns may be performed, for example, by the use of a plurality of solder bump bonds 52 formed or deposited on either the first or second registration patterns as shown in FIGS. 2 and 3. To align the first and second registration patterns, the second registration pattern 114 on the IOC may be coarsely aligned to the first registration pattern 50, with the two registration patterns in contact with each other, separated only by the solder bumps 52. The solder bumps 52 are then heated above the solder melting temperature, for example, by placing the IOC and package 10 on a heated stage or in a temperature-controlled oven. Upon melting the solder, the surface tension of the liquefied solder bumps 52 in contact with the first and second registration patterns acts to move the patterns into a near-exact alignment with each other. Upon cooling the solder, the solidified solder bump bonds 52 complete the passive alignment of the first and second registration patterns and attach the IOC 100 to the package 10. The solder bump bonds 52 and the first and second registration patterns may also be used to provide electrical interconnections between the IOC 100 and a wall of the package 10.

Additional electrical circuits and components 54 may be placed in the package 10 as shown in FIGS. 2 and 3. After the IOC 100 and components 54 are attached to the package and electrically connected, the package 10 may be hermetically sealed by attaching the first wall 12 to the open container 20. The form of attachment may be an adhesive, a solder (preferably having a melting temperature lower than that of the solder bump bonds 52), or a welded joint (for example, by laser welding the first wall 12 to the open container 20 at the edges thereof).

There has thus been shown a package and method for an integrated optic circuit that comprises a first wall having a plurality of microlenses formed therein to establish channels of optical communication with an integrated optic circuit within the package. A first registration pattern is provided on an inside surface of one of the walls of the package for alignment and attachment of the integrated optic circuit. The package may further comprise a fiber coupler and a fiber holder to extend the channels of optical communication to a plurality of optical fibers outside the package.

The matter set forth in the foregoing description and accompanying drawings is offered by way of illustration only and not as a limitation. Other applications and variations of the IOC package and method will become evident to those skilled in the art. The actual scope of the invention is intended to be defined in the following claims when viewed in their proper perspective based on the prior art.

What is claimed is:

1. A package for an integrated optic circuit comprising:
   (a) a first wall having a substrate portion comprising a plurality of microlenses forming a microlens pattern in a first surface thereof;
   (b) a plurality of walls interconnected and attached to the first wall for forming a closed container; and
   (c) a first registration pattern located on an inside surface of one of the walls for alignment and attachment of the integrated optic circuit, the first registration pattern corresponding to a second registration pattern on the integrated optic circuit when the first registration pattern is facing the second registration pattern, the first registration pattern further being in substantial alignment with the microlens pattern.

2. The package of claim 1 in which the closed container is hermetically sealed.

3. The package of claim 1 in which the substrate portion comprises a layered structure.

4. The package of claim 1 in which the first registration pattern is located on the first surface of the substrate portion.

5. The package of claim 1 in which the integrated optic circuit comprises a plurality of surface gratings in a device surface thereof, the surface gratings in the packaged circuit being superposed below the microlenses for establishing a plurality of channels of optical communication between the circuit and the microlenses.

6. The package of claim 5 in which the channels of optical communication are further extended to provide communication between the integrated optic circuit and a plurality of optical fibers, each optical fiber being positioned above a second surface of the substrate portion in alignment with one of the microlenses along an optical axis.

7. The package of claim 6 in which the optical fibers are single-mode fibers.

8. The package of claim 6 further comprising a fiber coupler formed in the second surface having a plurality of cavities therein for aligning the fibers with the microlenses at a focal point thereof.

9. The package of claim 8 in which the optical fibers are detachably connected to the fiber coupler.

10. The package of claim 8 in which the optical fibers are mounted in a fiber holder with a spaced relationship between the fibers, the fiber holder being connectable to the fiber coupler for establishing the channels of optical communication between the optical fibers and the integrated optic circuit.

11. The package of claim 1 in which a plurality of solder bump bonds are disposed between the first and second registration patterns.

12. The package of claim 1 in which the substrate portion comprises a transparent material selected from the group consisting of silicon, silicon dioxide, sapphire, glass, and plastic.

13. A method for packaging an integrated optic circuit comprising the steps of:
   (a) forming a microlens pattern comprising a plurality of microlenses in a first surface of a transparent substrate portion of a first wall, the microlens pattern being substantially equal in spatial arrangement to a plurality of surface gratings in a device surface of the integrated optic circuit when the first surface is facing the device surface, each microlens having a focal point;
   (b) forming a container by interconnecting the first wall and a plurality of other walls;

(c) forming a first registration pattern on one of the walls of the container, the first registration pattern corresponding to a second registration pattern on the integrated optic circuit when the first registration pattern is facing the second registration pattern and the first registration pattern being in substantial alignment with the microlens pattern when the container is closed;

(d) aligning the first registration pattern to the second registration pattern and attaching the integrated optic circuit to the wall of the container having the first registration pattern; and (e) sealing the container.

14. The method of claim 13 in which the container is hermetically sealed.

15. The method of claim 13 in which the substrate portion comprises a layered structure.

16. The method of claim 13 in which the step of aligning the first registration pattern to the second registration pattern and attaching the circuit to the wall of the container is performed by forming a plurality of solder bump bonds between the circuit and the wall having the first registration pattern.

17. The method of claim 13 further including the step of aligning a plurality of optical fibers proximate to a second surface of the substrate portion, each optical fiber being positioned at a focal point of one of the microlenses.

18. The method of claim 17 wherein the step of aligning the optical fibers proximate to the second surface of the substrate portion includes forming a fiber coupler within the second surface of the substrate portion and attaching the optical fibers to the fiber coupler.

19. The method of claim 18 in which the optical fibers are detachably connected to the fiber coupler.

20. The method of claim 17 wherein the step of aligning the optical fibers proximate to the second surface of the substrate portion includes forming a fiber coupler within the second surface of the substrate portion, mounting the optical fibers in a fiber holder, and attaching the fiber holder to the fiber coupler.

21. The method of claim 20 in which the fiber holder is detachably connected to the fiber coupler.

22. A method for packaging an integrated optic circuit comprising the steps of:

(a) forming a microlens pattern comprising a plurality of microlenses in a first surface of a transparent substrate portion of a first wall, the microlens pattern being substantially equal in spatial arrangement to a plurality of surface gratings in a device surface of the integrated optic circuit when the first surface is superposed over the device surface and facing the device surface, each microlens having a focal point;

(b) aligning a plurality of optical fibers proximate to a second surface of the substrate portion and attaching the optical fibers to the substrate portion, each optical fiber being positioned at a focal point of one of the microlenses;

(c) forming a container by interconnecting the first wall and a plurality of other walls;

(d) forming a first registration pattern on one of the walls of the container, the first registration pattern corresponding to a second registration pattern on the integrated optic circuit when the first registration pattern is facing the second registration pattern and the first registration pattern being in substantial alignment with the microlens pattern when the container is closed;

(e) aligning the first registration pattern to the second registration pattern and attaching the integrated optic circuit to the wall of the container having the first registration pattern; and (f) sealing the container.

23. The method of claim 22 in which the container is hermetically sealed.

24. The method of claim 22 in which the substrate portion comprises a layered structure.

25. The method of claim 22 in which the step of aligning the first registration pattern to the second registration pattern and attaching the circuit to the wall of the container is performed by forming a plurality of solder bump bonds between the circuit and the wall having the first registration pattern.

26. The method of claim 22 in which the step of aligning the optical fibers proximate to the second surface of the substrate portion includes forming a fiber coupler within the second surface of the substrate portion.

27. The method of claim 26 in which the optical fibers are detachably connected to the fiber coupler.

* * * * *